Feb. 18, 1947.    A. V. DE FOREST    2,416,090
STRAIN MEASURING AND RECORDING APPARATUS
Filed Feb. 17, 1943
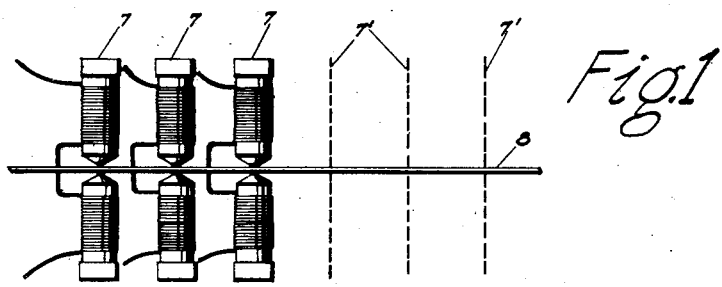
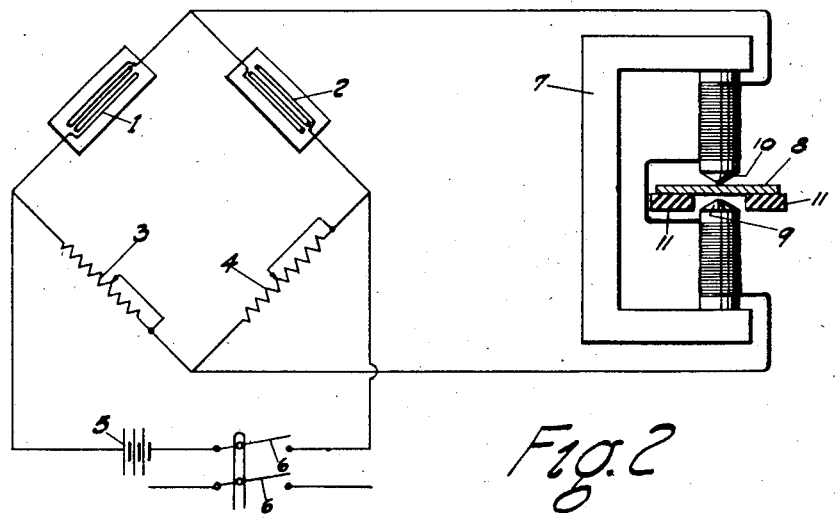
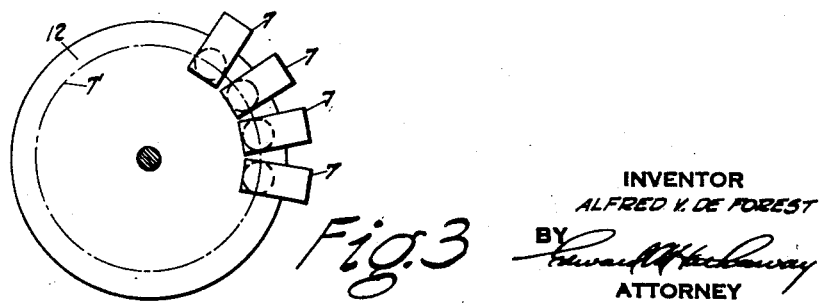
INVENTOR
ALFRED V. DE FOREST
BY
ATTORNEY Patented Feb. 18, 1947

2,416,090

UNITED STATES PATENT OFFICE 2,416,090

STRAIN MEASURING AND RECORDING APPARATUS

Alfred V. de Forest, Marlboro, N. H., assignor to The Baldwin Locomotive Works, a corporation of Pennsylvania Application February 17, 1943, Serial No. 476,242

5 Claims. (Cl. 73—88.5)

This invention relates generally to the field of measuring and recording strains occurring simultaneously at different points in structures of various types.

It is particularly desirable to simultaneously measure and record the strains at a large number of points on certain types of structures such, for example, as an airplane in flight so that at any given instant the stress distribution in the structure may be determined. The instant at which the strain measurements are to be taken may be determined by any one of a number of operating conditions such as when a predetermined load is applied to a structure or when an airplane has reached a predetermined acceleration as in a power dive or under other desired service conditions. The problem of determining stress distribution is especially difficult during dynamic testing, although the problem may exist in many static tests. In measuring strains at a large number of points on a structure it is desirable to use strain gages of an electrical resistance type that are extremely small, accurate and sensitive as well as being thoroughly reliable and stable and to this end it is preferable to employ well-known strain gages of the type having a fine wire filament bonded throughout its effective length to the structure under test whereby the electrical resistance of the filament varies in accordance with its strain.

Various attempts have been made to obtain substantially simultaneous readings of strain measurement at a multitude of points but these attempts have resulted in apparatus that is deficient either in its functional or structural aspect.

It is an object of my invention to provide an improved apparatus whereby strain in different parts of a structure may be simultaneously measured and recorded with a high degree of accuracy, sensitivity and reliability. Another object is to provide an improved recording apparatus that is relatively simple and economical in construction, operation and maintenance and is compact, sturdy and reliable.

A further object is to provide an improved apparatus for simultaneously measuring and recording strains in different parts of a structure without the need for individual amplifying and oscillograph elements for each strain gage but at the same time accomplishing a desirable degree of permanency in the recorded measurement so that the results can be adequately translated subsequent to the time of making the test.

I have found that the foregoing objects as well as other objects and advantages may be accomplished in one specific aspect of my invention by producing for each gage a magnetized spot on a stationary steel tape, the intensity of which spot may be determined in a recording at a later time. Thus if there are one hundred gages on the structure, then one hundred spots are created for the respective strain measurements, the magnetic intensity of each spot being in proportion to the strain on the corresponding individual gages. Each magnetic spot is created by an individual electro-magnet preferably connected across an individual electrical measuring bridge in which the strain gage constitutes one arm, the electro-magnet and tape being sensitive to a small degree of unbalance of the bridge circuit caused by variation of strain in the gage thereby impressing a magnetic record upon the tape without previous amplification.

In the prior art, magnetic records have been impressed on moving steel tapes or wires in a well-known manner but these have been used essentially for recording sonic frequencies as a substitute for well-known mechanical phonograph records and because of the moving character of the tape a single electro-magnet has been used to produce a continuous record on the tape moving at a constant speed. In my invention I depart radically from the prior art arrangements so as to obtain an individual and segregated spot recorded on the tape instead of a continuous magnetic track. Inasmuch as no relative motion occurs between my tape and electro-magnet, I am able to have optimum conditions of accuracy and reliability, it being of course well-known that the thickness and magnetic characteristics of the tape material must be such that the intensity of magnetization or demagnetization from a prior uniform magnetization is in proportion to the amount of current flowing through the magnet. Inasmuch as such characteristics and their relationship in the art are well-known, it need not be further mentioned herein as it will suffice to state that the tape preferably is made of a material of relatively high coercive force and the amount of magnetization is below the saturation value of the tape metal. Also, it is not necessary that the resulting magnetization be linearly proportional to the magnetizing current, as corrections may be made in plotting the final translated result.

Other objects and advantages will be more apparent to those skilled in the art from the following description of the accompanying drawing in which:

Fig. 1 is a diagrammatic side elevation of my improved combination of a plurality of electromagnets and the stationary tape;

Fig. 2 is a diagrammatic outline of a bridge circuit and of one side of an electro-magnet together with the tape shown in cross-section; and Fig. 3 is a plan view of a disk on which the magnetic spots may be impressed.

As shown in Fig. 2 a suitable electrical strain gage such as a fine wire filament 1 is cemented or otherwise suitably bonded throughout its entire effective length to the surface of a member under test. Any number of these gages may be employed and positioned at individual points on the structure under test but for purposes of explanation only one strain responsive gage is disclosed in Fig. 2. It will be understood that the whole of Fig. 2 would be repeated for each additional gage. A similar but unloaded gage 2, herein referred to as a dummy gage, constitutes one arm of a simple Wheatstone bridge while the strain gage 1 and adjustable resistances 3 and 4 form the other arms. This bridge is supplied from a battery 5 through a switch 6. The output of the bridge is carried to a magnetizing yoke 7 which serves to impress a magnetized spot on a magnetizable metal tape 8 between poles 9 and 10 of the yoke. These poles are of suitable shape, preferably terminating in a small flat circular area disposed relatively closely to the opposed surfaces of the tape 8 thereby causing the magnetic spot to be circular. Thus it is seen that when the strain gage 1 responds to a deformation of the structure under test the electrical resistance of the gage will be varied and accordingly unbalance the bridge to cause a predetermined electro-magnetic condition to be impressed upon the yoke 7 which produces an individual magnetized spot on tape 8 of definite magnetic intensity. As shown in Fig. 1, any number of magnets 7, certain of which are diagrammatically indicated by dotted lines 7', may be placed close to each other and extend along the length of the common tape 8. This tape can be suitably supported on longitudinal guides 11 so as to maintain the tape equal distances from the poles 9 and 10, thus insuring uniform conditions affecting the magnetization of the tape, or the tape may be in direct contact with the pole faces. To energize the multiplicity of individual magnets, the switches 6 for each circuit are closed simultaneously and kept closed for a length of time preferably .01 to .1 second. For simplicity, one complete circuit only is shown in Fig. 2 and a portion of another circuit is diagrammatically shown therein to illustrate the manner in which a multiplicity of circuits are closed simultaneously by a common switch operating rod 12. The length of time during which switches 6 are kept closed depends upon the sensitivity for which the magnetic yoke and tape may be designed, inasmuch as the inductance of each circuit will not allow maximum magnetization in an indefinitely short time. Only the length of time required to reach a stable state of local magnetization is necessary, and a longer time serves no useful purpose. The magnetic property and thickness of the tape will be such, as is well-known, that the intensity of the magnetization of the resulting spot produces a measurable signal when the tape recording is transcribed as hereinafter referred to. To insure a proper magnetic condition of the tape prior to producing the spots thereon, the tape may be totally demagnetized or the tape may be caused to have partially or totally polarized condition.

After the magnetic record is placed upon the tape, the latter may be passed through a well-known pick-up coil and associated equipment such as normally used for the reproduction of continuous magnetic tape records heretofore referred to, except that in such prior arrangements the tape is continuously moved in order to obtain the complete reproduction whereas a convenient method in my arrangement would be to cut the tape into individual pieces each one containing one magnetic spot from each yoke. If one hundred yokes were in use and they were placed one inch apart the tape would be cut into a length of 101 inches. If desired, each cut piece of tape or successive cut pieces might be wrapped around a drum of suitable diameter and rotated under a single one of the well-known pick-up coils at a speed convenient for the amplifying and recording apparatus used to transfer the record from the tape to a reading on photographic film, paper, or other record. Such pick-up and recording apparatus is manufactured by The Brush Development Company of Cleveland, Ohio.

The exact method of transcribing the record from the tape is not an integral part of this invention inasmuch as pick-up coils and suitable recording means are already well-known in the art as above indicated. My invention embodies simultaneous implanting of a magnetic record by a plurality of magnetizing yokes on a stationary tape in which the magnetic intensity of each individual record bears a predetermined relation to the strain. While I have described a system operating on a continuous length of tape, I could employ a steel disk 12 around which the recording magnets 7 are disposed close to the circumference of this disk. After making the record on the disk it may be replaced by a similar disk for further tests and all the disks transported to a laboratory for transcription.

From the foregoing disclosure, it is seen that I have provided an improved method and apparatus for making a plurality of individual records on a stationary magnetic member through the operation of a plurality of recording yokes instead of employing a varying magnetism applied to a moving tape or disk by means of a single magnetizing yoke. In addition to accomplishing the results heretofore described, I am also able to overcome the need for individual amplifiers and oscillograph elements for each gage, thus eliminating both the weight and expense of such equipment, particularly where more than ten or twenty measurements are needed. The simplicity of my improved system is such that the number of readings is limited only by the relatively small space required for individual electro-magnets which may be conveniently carried in an airplane during flight or carried by an operator as a portable piece of equipment from one structure to another. In each case, however, the fundamental method of my invention is employed, namely, of impressing a magnetic spot upon a stationary tape in response to a variation in strain of a gage whereby a multiplicity of strain measurements at different points on a structure may be simultaneously recorded on the tape merely by providing individual electro-magnets for each measurement and then transcribing the individual spots to determine their magnetic intensity and accordingly the magnitude of the individual strains.

It will of course be understood that various changes in details of construction and arrangement of parts may be made by those skilled in the art without departing from the spirit of the invention as set forth in the appended claims.

I claim:

1. Apparatus for recording strain of a structure comprising, in combination, an electrical impedance strain gage of the type in which the electrical impedance varies in accordance with the strain to be measured, an electro-magnet having provision for producing a magnetic field of variable intensity in a localized area outside of the magnet, means whereby the intensity of the magnetic field of said magnet may be varied in accordance with the change of resistance of said gage arising from the strain of the structure at the point where said gage is located, and a record receiving member of magnetizable material disposed in said outside area adjacent to said magnet so as to be subject to the localized magnetic field of predetermined intensity in accordance with the magnitude of the change of strain in the gage, said record receiving member and electro-magnet being normally fixed relative to each other during a recording operation.

2. The combination set forth in claim 1 further characterized by the provision of a plurality of said electro-magnets and a corresponding number of strain gages, one for each magnet, whereby a plurality of individual strain recordings may be made simultaneously in response to the variations in strain in a plurality of strain gages at different points on the structure under test, and means for simultaneously energizing said magnets.

3. The combination set forth in claim 1 further characterized by the provision of a plurality of said electro-magnets and a corresponding number of strain gages, one for each magnet, whereby a plurality of individual strain recordings may be made simultaneously in response to the variations in strain in a plurality of strain gages at different points on the structure under test and the record receiving member being a single element extending commonly between the poles of said yokes, and means for simultaneously energizing said magnets.

4. Apparatus for recording strains occurring in a structure at various points thereof comprising, in combination, a plurality of strain gages of a type in which each gage is adapted to produce an individual electrical effect in accordance with a predetermined strain to be measured, a plurality of bridge circuits, one arm of each circuit being formed of one of said strain gages, a plurality of electro-magnets connected respectively to said bridges so that each electro-magnet is responsive to the unbalance of its bridge, said magnets having provision for producing a magnetic field of variable intensity in a localized area outside of the magnet, means for simultaneously energizing all of said bridges so as to produce an intensity of magnetic fields in the individual magnets in accordance with the electrical effect of the respective gages, and a stationary record receiving member of magnetizable material disposed in said outside area and adapted to be subject to the localized magnetic fields of the individual magnets whose magnetic intensity is determined by the magnitude of the change of electrical effects of the gage.

5. Apparatus for recording strain of a structure comprising, in combination, a strain gage of the type having an electrical resistance filament whose resistance varies in accordance with change of strain to be measured, a bridge in which said gage constitutes one arm, an electro-magnet connected to said bridge to receive current therefrom as a result of bridge unbalance caused by a change of resistance of the strain gage, said magnet having provision for producing a magnetic field of variable intensity in a localized area outside of the magnet, a source of current for the bridge, a switch for controlling the supply of current to the bridge so that electrical operation of the bridge produces an electro-magnetic field whose intensity is determined by the strain of the filament, and a stationary record receiving member of magnetizable material disposed in said outside area and adapted to be subject to the localized magnetic fields of the individual magnets whose magnetic intensity is determined by the magnitude of the change of electrical effects of the gage.

ALFRED V. DE FOREST.

REFERENCES CITED

The following references are of record in the file of this patent:

UNITED STATES PATENTS

| Number | Name | Date |
| --- | --- | --- |
| 2,252,464 | Kearns, Jr. et al. | Aug. 12, 1941 |
| 2,292,549 | Simmons, Jr. | Aug. 11, 1942 |
| 2,333,463 | Bryce | Nov. 2, 1943 |